US012633979B2

(12) United States Patent
Wei

(10) Patent No.: US 12,633,979 B2
(45) Date of Patent: May 19, 2026

(54) FAST BEAM ALIGNMENT TECHNIQUES

(71) Applicant: ZTE Corporation, Shenzhen (CN)

(72) Inventor: Ning Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 39 days.

(21) Appl. No.: 18/641,982

(22) Filed: Apr. 22, 2024

(65) Prior Publication Data

US 2024/0275447 A1      Aug. 15, 2024

Related U.S. Application Data

(63) Continuation of application No. PCT/CN2022/082657, filed on Mar. 24, 2022.

(51) Int. Cl.
*H04B 7/06* (2006.01)
*H04B 7/0413* (2017.01)
*H04L 1/00* (2006.01)

(52) U.S. Cl.
CPC ......... *H04B 7/0617* (2013.01); *H04B 7/0413* (2013.01); *H04L 1/0025* (2013.01)

(58) Field of Classification Search
CPC .. H04B 7/0413; H04B 7/0617; H04B 7/0641; H04L 1/0025
See application file for complete search history.

(56) References Cited

U.S. PATENT DOCUMENTS

| | | | | |
|---|---|---|---|---|
| 11,509,381 | B2 * | 11/2022 | Newman | ............... H04W 24/10 |
| 2017/0201893 | A1 | 7/2017 | Seol et al. | |
| 2021/0105061 | A1 * | 4/2021 | Godala | ................... H04B 7/088 |
| 2021/0195436 | A1 * | 6/2021 | Hong | ................. H04B 7/06952 |

FOREIGN PATENT DOCUMENTS

| | | |
|---|---|---|
| CN | 103401595 | 11/2013 |
| CN | 103765794 | 4/2014 |
| CN | 108123745 | 6/2018 |
| CN | 109891769 | 6/2019 |
| EP | 3273717 | 1/2018 |
| EP | 3944527 | 1/2022 |
| WO | 2020/093074 | 5/2020 |

OTHER PUBLICATIONS

International Search Report and Written Opinion for PCT/CN2022/082657, filed Mar. 24, 2022, Report dated Nov. 30, 2022, 9 pages. Extended European Search Report for 22932649.1, Report dated Nov. 14, 2024, 12 pages.

* cited by examiner

*Primary Examiner* — David B Lugo
(74) *Attorney, Agent, or Firm* — Perkins Coie LLP

(57)      ABSTRACT
Techniques are described for beam alignment techniques. An example wireless communication method includes transmitting, by a transmitter device to a receiver device, a wireless frame spatially modulated by a transmission beam of a transmission beam width, where the wireless frame includes a pilot pattern that is mapped to a modulation angle of the transmission beam; and receiving, from the receiver device, a corrected modulation angle value and a modulation angle increment value.

14 Claims, 17 Drawing Sheets

800

| Processor(s) 810 | Memory 805 |
|---|---|
| Receiver 820 | Transmitter 815 |

FIG. 8

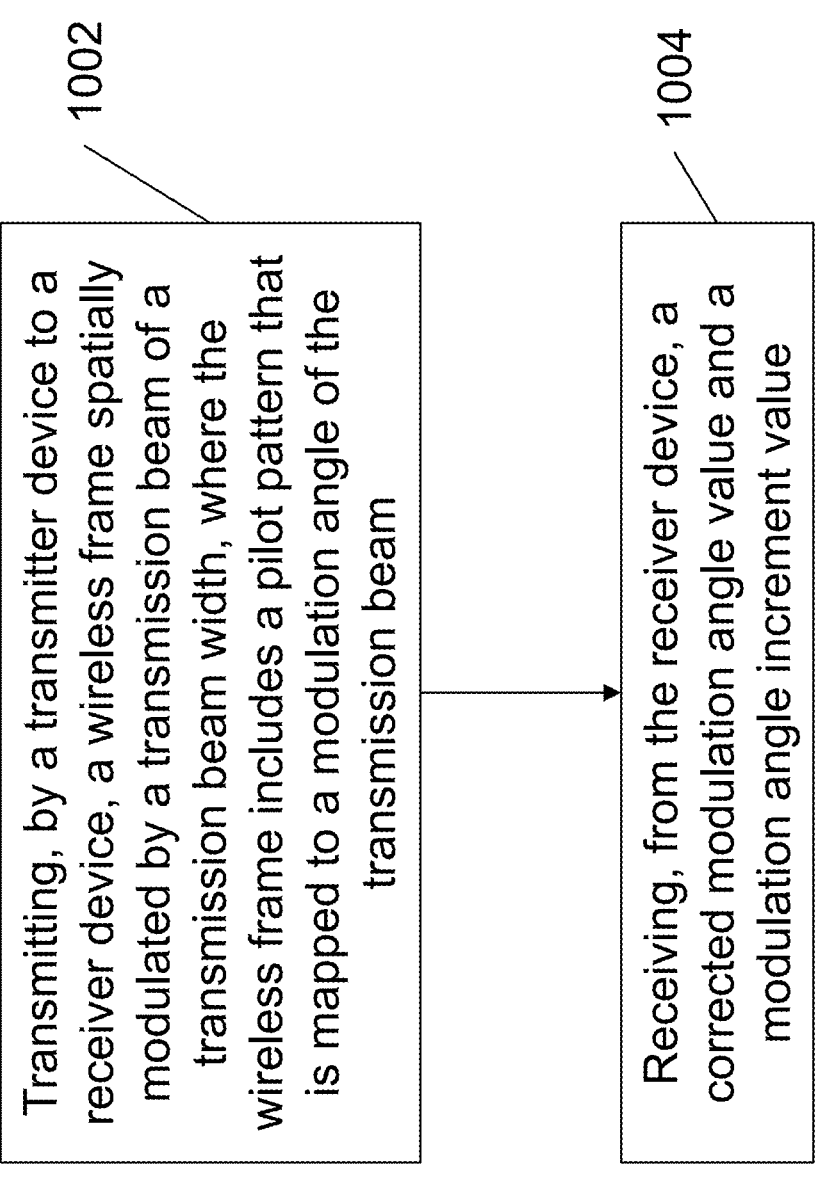

1002

Transmitting, by a transmitter device to a receiver device, a wireless frame spatially modulated by a transmission beam of a transmission beam width, where the wireless frame includes a pilot pattern that is mapped to a modulation angle of the transmission beam

1004

Receiving, from the receiver device, a corrected modulation angle value and a modulation angle increment value

FIG. 10

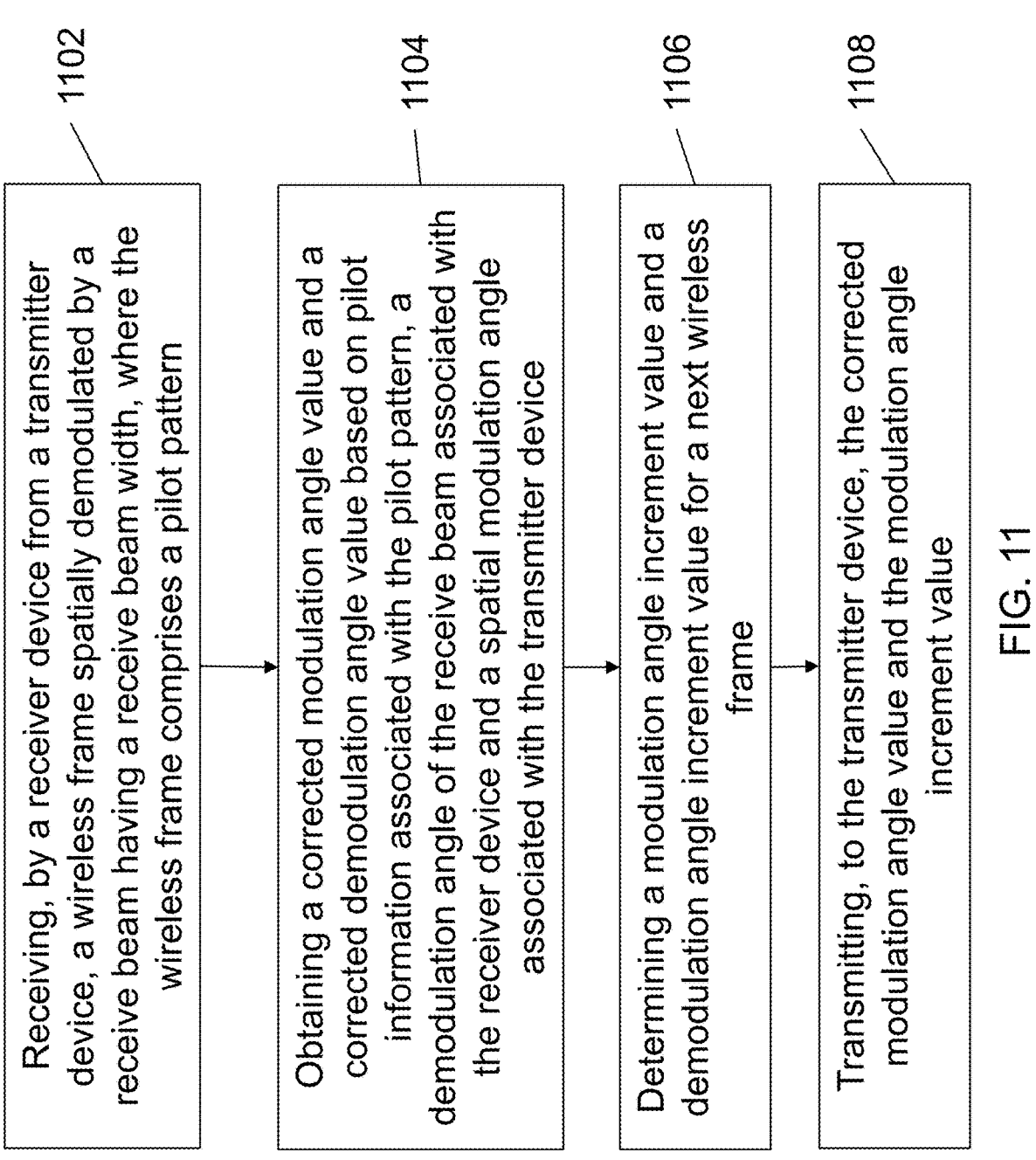

1102 Receiving, by a receiver device from a transmitter device, a wireless frame spatially demodulated by a receive beam having a receive beam width, where the wireless frame comprises a pilot pattern 1104 Obtaining a corrected modulation angle value and a corrected demodulation angle value based on pilot information associated with the pilot pattern, a demodulation angle of the receive beam associated with the receiver device and a spatial modulation angle associated with the transmitter device 1106 Determining a modulation angle increment value and a demodulation angle increment value for a next wireless frame 1108 Transmitting, to the transmitter device, the corrected modulation angle value and the modulation angle increment value

FIG. 11

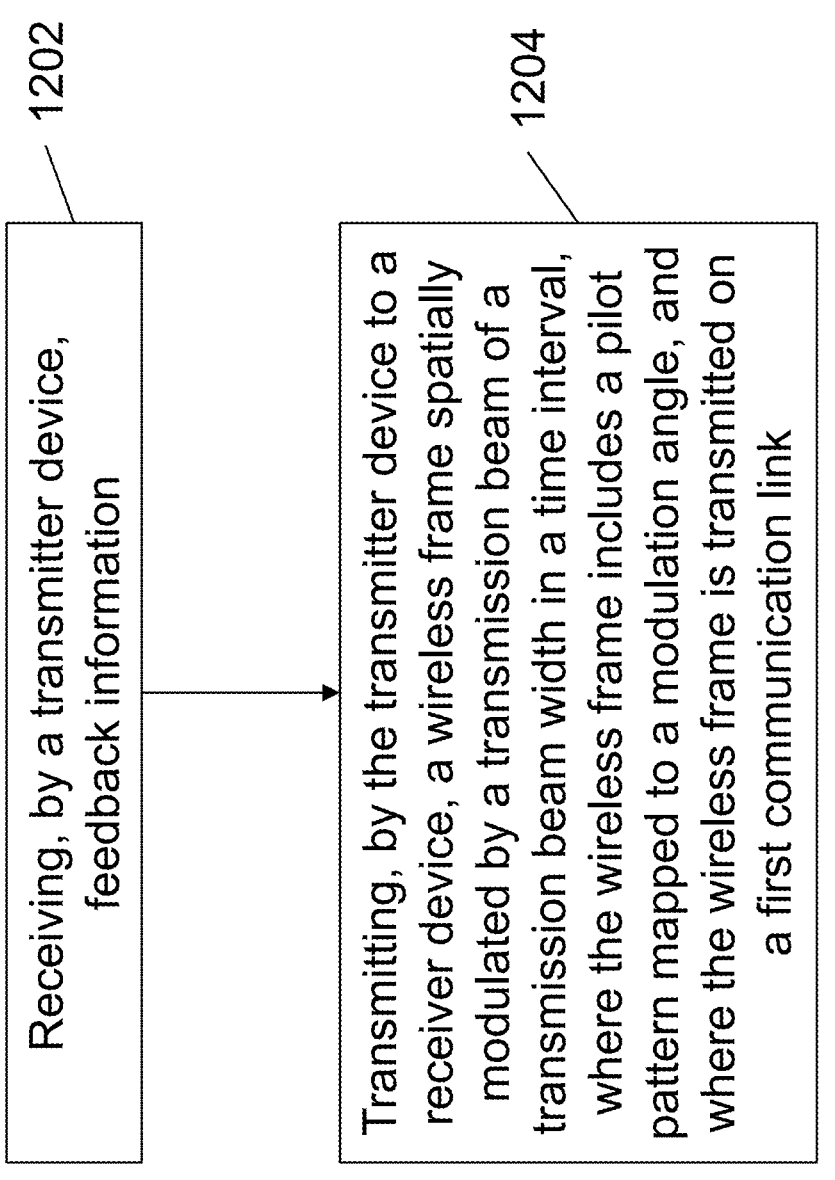

1202

Receiving, by a transmitter device, feedback information

1204

Transmitting, by the transmitter device to a receiver device, a wireless frame spatially modulated by a transmission beam of a transmission beam width in a time interval, where the wireless frame includes a pilot pattern mapped to a modulation angle, and where the wireless frame is transmitted on a first communication link

FIG. 12

Receiving, by a receiver device, a wireless frame spatially demodulated by a receive beam having a receive beam width, where the wireless frame comprises a pilot pattern
1302

Transmitting, to a transmitter device, feedback information related to pilots of the pilot pattern
1304 determining, by a transmitter device, a modulation angle and a modulation angle increment value — 1402

Transmitting, by the transmitter device to a receiver device, a wireless frame spatially modulated by a transmission beam of a transmission beam width, where the wireless frame includes a pilot pattern that is mapped to the modulation angle — 1404

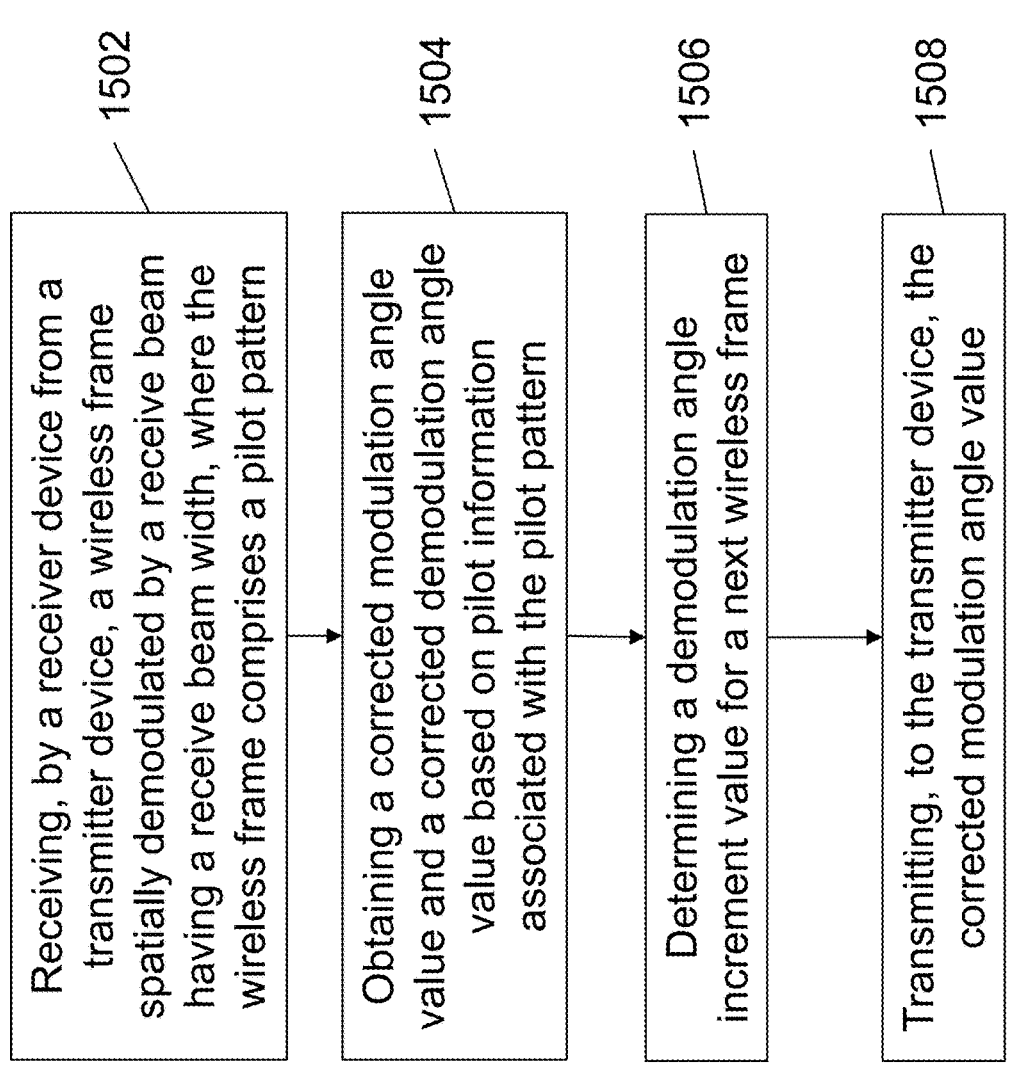

Receiving, by a receiver device from a transmitter device, a wireless frame spatially demodulated by a receive beam having a receive beam width, where the wireless frame comprises a pilot pattern

1502

Obtaining a corrected modulation angle value and a corrected demodulation angle value based on pilot information associated with the pilot pattern

1504

Determining a demodulation angle increment value for a next wireless frame

1506

Transmitting, to the transmitter device, the corrected modulation angle value

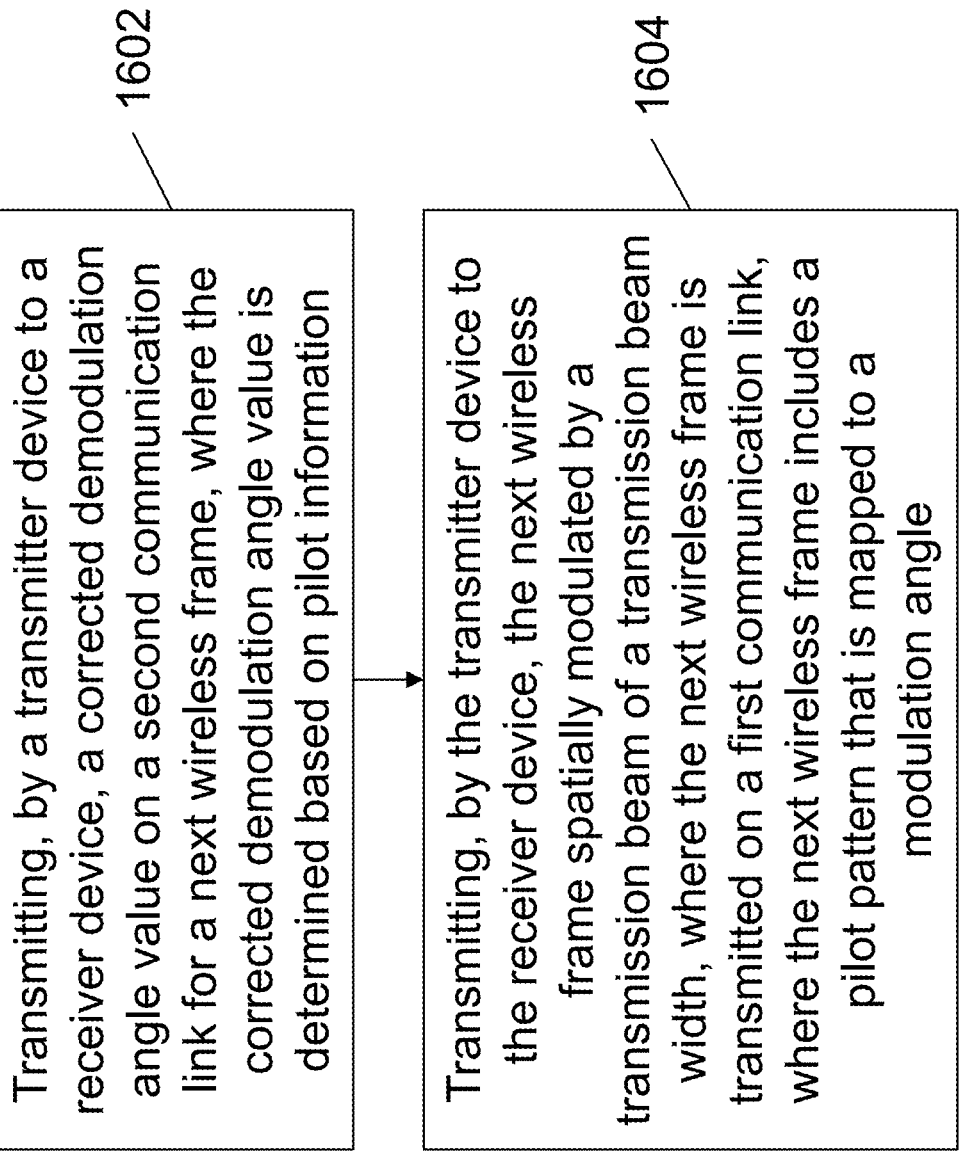

1602

Transmitting, by a transmitter device to a receiver device, a corrected demodulation angle value on a second communication link for a next wireless frame, where the corrected demodulation angle value is determined based on pilot information

1604

Transmitting, by the transmitter device to the receiver device, the next wireless frame spatially modulated by a transmission beam of a transmission beam width, where the next wireless frame is transmitted on a first communication link, where the next wireless frame includes a pilot pattern that is mapped to a modulation angle

Determining a demodulation angle and a receive beam width based on a set of information

1704

Receiving, by a receiver device from a transmitter device, a wireless frame spatially demodulated by a receive beam of the receive beam width, where the wireless frame comprises a pilot pattern

FAST BEAM ALIGNMENT TECHNIQUES

CROSS REFERENCE TO RELATED APPLICATIONS

This patent document is a continuation of and claims benefit of priority to International Patent Application No. PCT/CN2022/082657, filed on Mar. 24, 2022. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for performing beam alignment techniques.

A first wireless communication method includes transmitting, by a transmitter device to a receiver device, a wireless frame spatially modulated by a transmission beam of a transmission beam width, where the wireless frame includes a pilot pattern that is mapped to a modulation angle of the transmission beam; and receiving, from the receiver device, a corrected modulation angle value and a modulation angle increment value.

In some embodiments, a pilot in the pilot pattern is modulated by a single spatial beam or a weighted combination of multiple spatial beams. In some embodiments, the modulation angle and the transmission beam width are determined based on a set of information regarding spatial channel. In some embodiments, the set of information includes any one or more of: a current modulation angle and a previous modulation angle, a current modulation angle increment and a previous modulation angle increment, a relative moving speed between the transmitter device and the receiver device, an atmospheric temperature, a humidity, a wind speed, and/or an image information that provides information about an area where the transmitter device is operating. In some embodiments, the method further comprises determining, by the transmitter device, the modulation angle for a next wireless frame using the corrected modulation angle value and the modulation angle increment value, where the modulation angle for the next wireless frame is a sum of the corrected modulation angle value and the modulation angle increment value.

A second wireless communication method includes receiving, by a receiver device from a transmitter device, a wireless frame spatially demodulated by a receive beam having a receive beam width, where the wireless frame comprises a pilot pattern; obtaining a corrected modulation angle value and a corrected demodulation angle value based on pilot information associated with the pilot pattern, a demodulation angle of the receive beam associated with the receiver device and a spatial modulation angle associated with the transmitter device; determining a modulation angle increment value and a demodulation angle increment value for a next wireless frame; and transmitting, to the transmitter device, the corrected modulation angle value and the modulation angle increment value.

In some embodiments, the demodulation angle and the receive beam width is determined based on a set of information. In some embodiments, the set of information includes any one or more of: a current demodulation angle and a previous demodulation angle, a current demodulation angle increment and a previous demodulation angle increment, a relative moving speed between the transmitter device and the receiver device, an atmospheric temperature, a humidity, a wind speed, and/or an image information that provides information about an area where the receiver device is operating.

A third wireless communication method includes receiving, by a transmitter device, feedback information; and transmitting, by the transmitter device to a receiver device, a wireless frame spatially modulated by a transmission beam of a transmission beam width in a time interval, where the wireless frame includes a pilot pattern mapped to a modulation angle, and where the wireless frame is transmitted on a first communication link.

In some embodiments, the feedback information includes information related to a plurality of pilots of the pilot pattern received by the receiver device in another time interval that precedes the time interval. In some embodiments, the method further comprises correcting, prior to the transmitting the wireless frame, the modulation angle and a demodulation angle; determining a modulation angle increment value and a demodulation angle increment value; and transmitting, to the receiver device, the demodulation angle and the demodulation angle increment value on a second communication link.

A fourth wireless communication method includes receiving, by a receiver device, a wireless frame spatially demodulated by a receive beam having a receive beam width, where the wireless frame comprises a pilot pattern; and transmitting, to a transmitter device, feedback information related to pilots of the pilot pattern.

In some embodiments, the feedback information includes information related to a plurality of pilots of the pilot pattern received by the receiver device.

A fifth wireless communication method includes determining, by a transmitter device, a modulation angle and a modulation angle increment value; and transmitting, by the transmitter device to a receiver device, a wireless frame spatially modulated by a transmission beam of a transmission beam width, where the wireless frame includes a pilot pattern that is mapped to the modulation angle.

In some embodiments, the modulation angle is determined based on a set of information that includes any one or more of: a current modulation angle and a previous modulation angle, a current modulation angle increment and a previous modulation angle increment, a relative moving speed between the transmitter device and the receiver device, an atmospheric temperature, a humidity, a wind speed, and/or an image information that provides information about an area where the transmitter device is operating.

A sixth wireless communication method includes receiving, by a receiver device from a transmitter device, a wireless frame spatially demodulated by a receive beam having a receive beam width, where the wireless frame comprises a pilot pattern; obtaining a corrected modulation angle value and a corrected demodulation angle value based on pilot information associated with the pilot pattern; determining a demodulation angle increment value for a next wireless frame; and transmitting, to the transmitter device, the corrected modulation angle value.

In some embodiments, a demodulation angle of the receive beam and the receive beam width of the receive beam are determined based on a set of information. In some embodiments, the set of information includes any one or more of: a current demodulation angle and a previous demodulation angle, a current demodulation angle increment and a previous demodulation angle increment, a relative moving speed between the transmitter device and the receiver device, an atmospheric temperature, a humidity, a wind speed, and/or an image information that provides information about an area where the receiver device is operating.

A seventh wireless communication method includes transmitting, by a transmitter device to a receiver device, a corrected demodulation angle value on a second communication link for a next wireless frame, where the corrected demodulation angle value is determined based on pilot information; and transmitting, by the transmitter device to the receiver device, the next wireless frame spatially modulated by a transmission beam of a transmission beam width, where the next wireless frame is transmitted on a first communication link, where the next wireless frame includes a pilot pattern that is mapped to a modulation angle.

In some embodiments, the transmitter device determines the corrected demodulation angle value and a corrected modulation angle value based on the pilot information. In some embodiments, the transmitter device determines the modulation angle based on a set of information that includes any one or more of: a current modulation angle and a previous modulation angle, a current modulation angle increment and a previous modulation angle increment, a relative moving speed between the transmitter device and the receiver device, an atmospheric temperature, a humidity, a wind speed, and/or an image information that provides information about an area where the transmitter device is operating.

A eighth wireless communication method includes determining a demodulation angle and a receive beam width based on a set of information; and receiving, by a receiver device from a transmitter device, a wireless frame spatially demodulated by a receive beam of the receive beam width, where the wireless frame comprises a pilot pattern.

In some embodiments, the set of information includes any one or more of: a current demodulation angle and a previous demodulation angle, a current demodulation angle increment and a previous demodulation angle increment, a relative moving speed between the transmitter device and the receiver device, an atmospheric temperature, a humidity, a wind speed, and/or an image information that provides information about an area where the receiver device is operating.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

Figure 8:
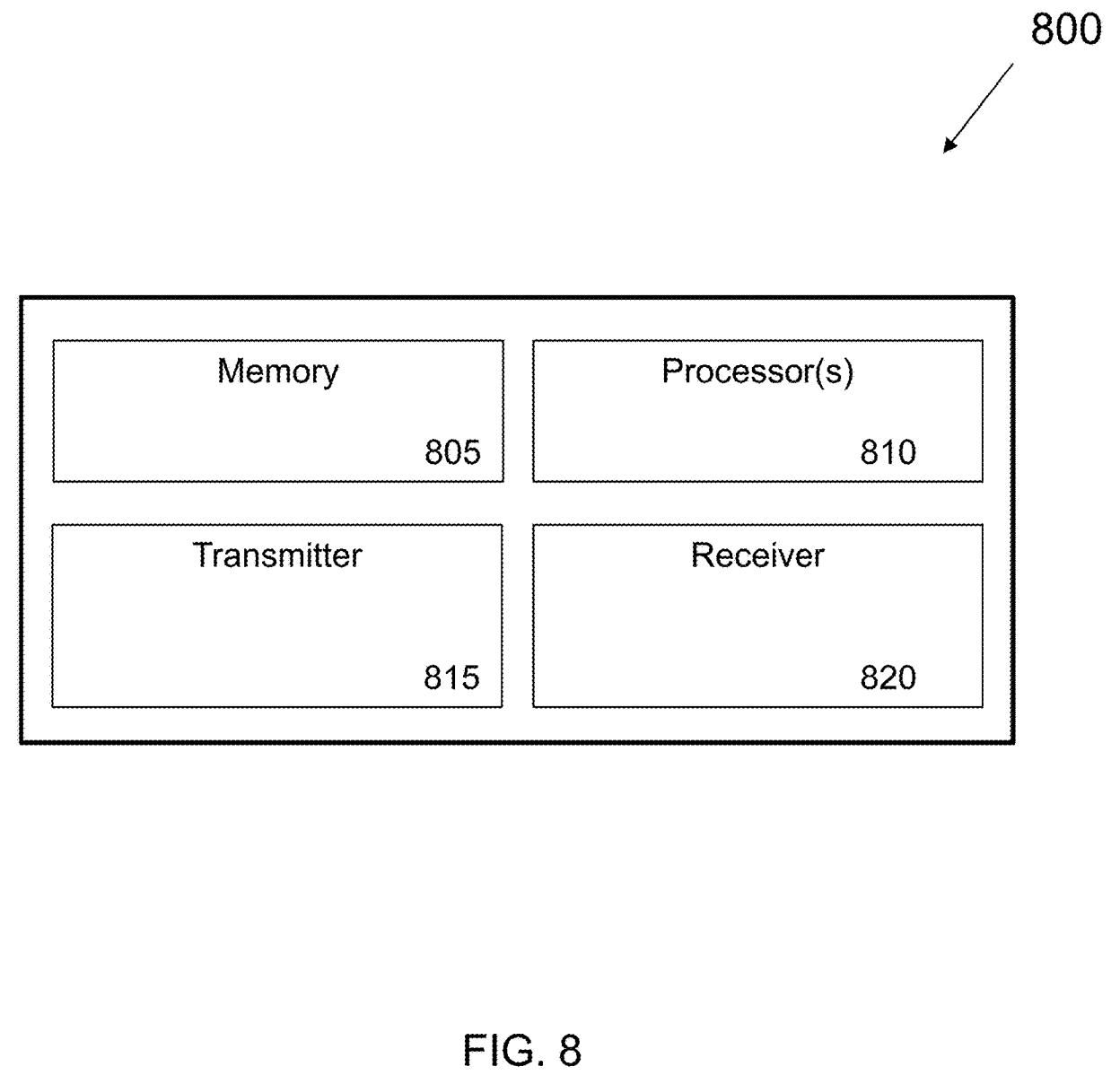

FIG. 8 shows an exemplary block diagram of a hardware platform that may be a part of a network device or a communication device.

FIG. 10 shows an exemplary flowchart for a transmitter device to receive a corrected modulation value and a modulation angle increment value.

FIG. 11 shows an exemplary flowchart for a receiver device to transmit a corrected modulation angle value and a modulation angle increment value.

FIG. 12 shows an exemplary flowchart for a transmitter device to transmit wireless frame spatially modulated by a transmission beam of a transmission beam width.

FIG. 15 shows an exemplary flowchart for a receiver device to transmit a corrected modulation angle value.

FIG. 16 shows an exemplary flowchart for a transmitter device to transmit a wireless frame.

DETAILED DESCRIPTION

Figure 1:
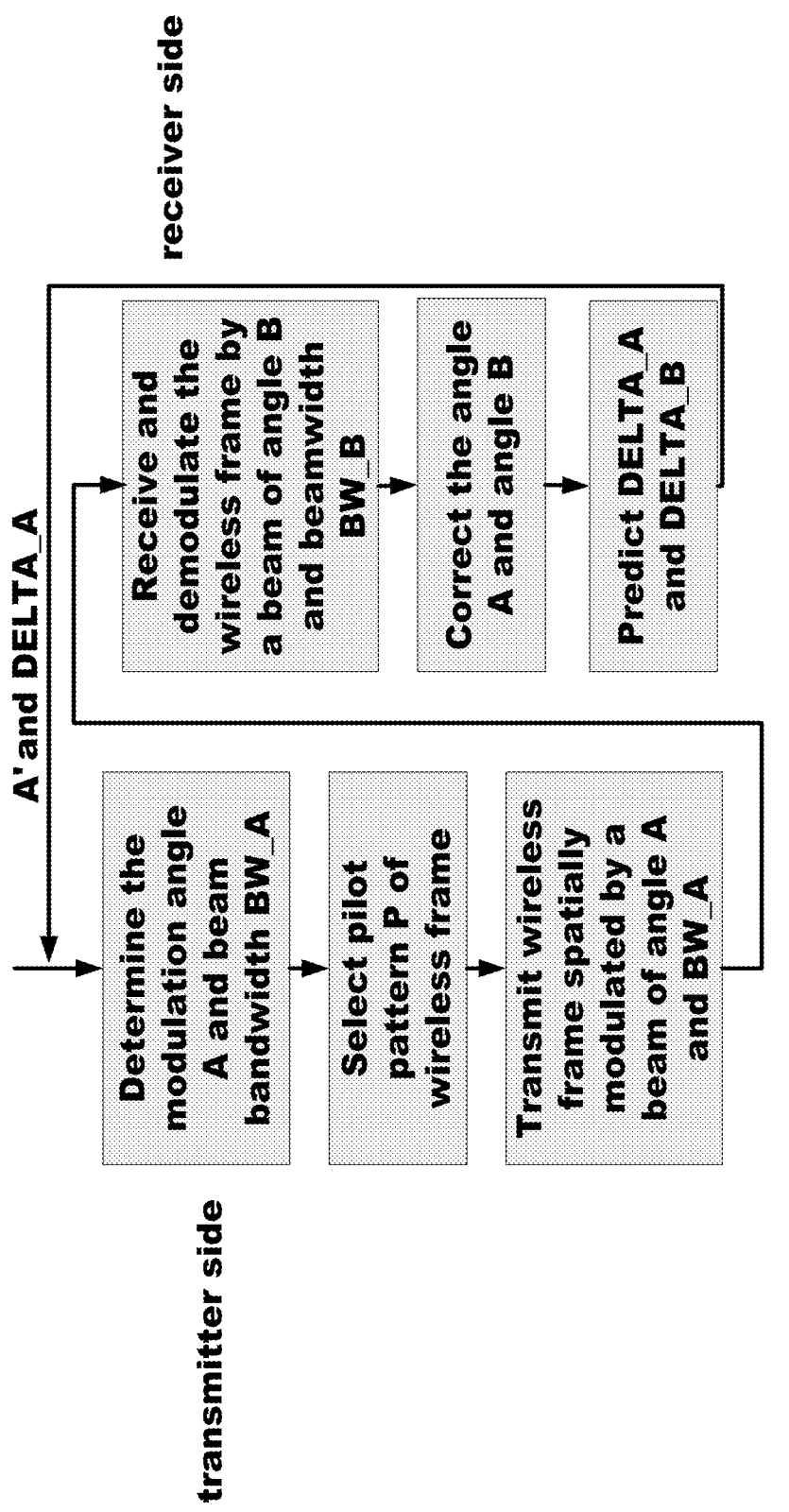
FIG. 1 shows a flow diagram of an example method for fast beam alignment according to an embodiment.
Figure 2A:
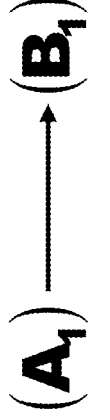
FIGS. 2A to 2D show four examples of matching transmission beam with and receive beam.
Figure 2B:
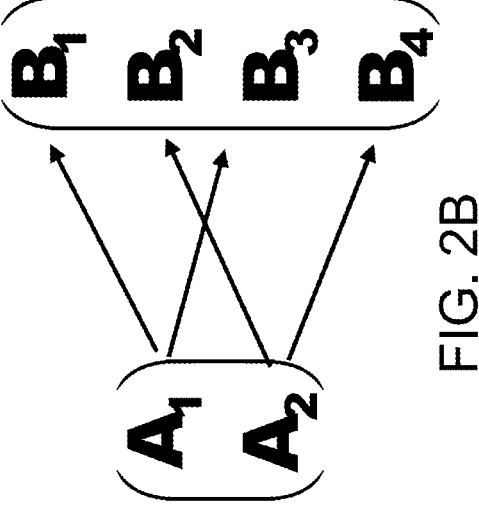
Figure 2C:
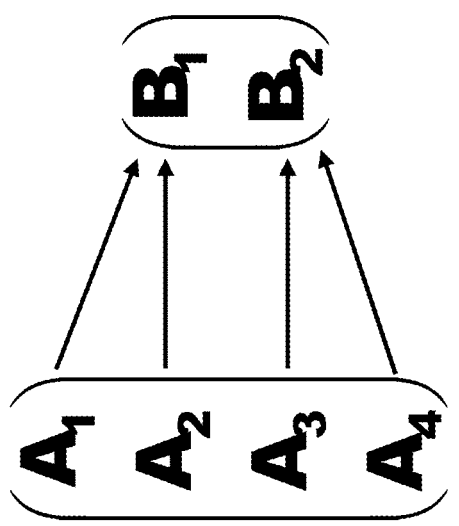
Figure 2D:
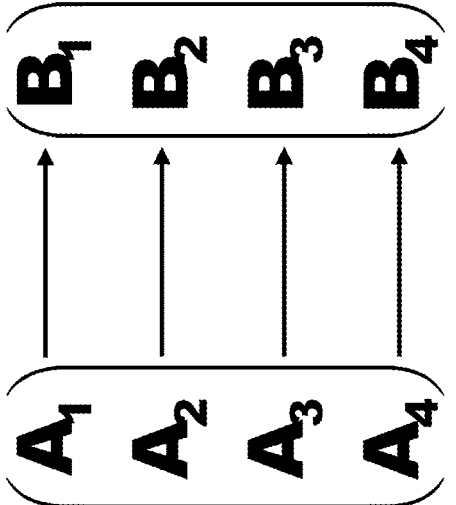

Spatial beam is receiving more and more industry attention because of its excellent performance in signal enhancement. Some standard organizations, such as IEEE and 3GPP, are working on standardization work related to spatial beam technology. In the early work, the beam alignment and the corresponding pilot symbol design are the focus and key points of the physical layer design. The primary goal of beam alignment is that the transmitter and receiver can transmit and receive control signaling and data services respectively along accurate transmission and receive direction. Currently, traditional beam scanning is mainstream technical approach to achieving beam alignment in the industry field, which is based on the exhaustive search to estimate optimal beams at the transmitter side and the receiver side. Traditional beam scanning encompasses the following operations: the transmitter transmits the sounding signal using all predefined transmission beam candidates; correspondingly, while performing the receiving using all predefined receive beam candidates, the receiver needs to measure and record the strength of the received sounding signal; ultimately, the beam with the strongest received sounding signal is selected as the optimal one.

One of the disadvantages of the traditional beam scanning method is that it cannot effectively balance between beam accuracy and system efficiency. In general, supporting a higher beam accuracy is equivalent to enlarging the scanning space. This implies that in the time-varying environment the communication system must confront a serious efficiency issue because plenty of resources are allocated to the scanning process, rather than normal data services transmission. To overcome at least the technical problems mentioned with conventional scanning process, this patent document discloses a technical solution to maximize system efficiency with respect to limited resources allocated to beam alignment.

Known signals used to estimate channel state information can be generally referred to as pilots. Although different systems have independent naming rules, for simplicity, this patent document can refer to them as pilots. In this patent document, the channel state information can refer to the parameter information that describes the channel characteristics as a whole, including but not limited to propagation delay, propagation direction (angle) and/or doppler frequency. In 3GPP standards, the pilot may be a reference signal, and in IEEE standards, the pilot may be training symbol.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G or 6G terminology is used for the sake of clarity of explanation, but the techniques disclosed in the present document are not limited to 5G or 6G technology only, and may be used in wireless systems that implemented other protocols.

I. Introduction to Fast Beam Scanning Technology

When the user moves continuously in the geographical environment, channel parameters like beam angles etc., probably undergo deterministic continuous changes. Therefore, if transmitting and receiving wireless signals using beams with moderate bias, information related to spatial beam will be obtained by resolving a mathematical problem based on the pilots in the received signal.

In this patent document, the physical entity corresponding to the sender may be a base station BS (Base Station), a node eNodeB, an access point AP (Access Point), user equipment or terminal equipment including mobile phones, etc.; the physical entity corresponding to the receiver may be a base station BS, node eNodeB, Access point AP (Access Point), user equipment or terminal equipment, etc.; the pilot pattern comprises the number of used pilots and positions in resource blocks

II. Example Embodiment 1

FIG. 1 shows a flow diagram of an example method for fast beam alignment according to Embodiment 1. The transmitter determines the modulation direction/angle A and the transmission beam width BW_A based on the information TM (further explained below); selects the pilot pattern P associated with A; spatially modulates a wireless frame using a transmission beam of modulation direction/angle A, where the wireless frame carries or includes the pilot pattern P; and transmits the modulated wireless frame to the receiver. The receiver determines the demodulation direction/angle B and beam width BW_B based on the information RM; receives and demodulates the wireless frame using a receive beam of demodulation direction/angle B; corrects A and B based on pilot information (PI) of pilot pattern P of the received wireless frame, where the corresponding correction results are A' and B'; predicts the angle increments of A and B e.g., DELTA_A and DELTA_B, for a next wireless frame; feeds back A' and DELTA_A to the transmitter. DELTA_A can be predicted by the current A and previous A, and DELTA_B can be predicted by the current B and previous B.

In another case, A and B for the next wireless frame are predicted by the receiver. In another case, a different parameter from A' and DELTA_A can be fed back to the transmitter, which is used for recovering the angle of A for the next wireless frame Information TM includes but is not limited to any one or more of: current and previous modulation angle information A, current and previous angle increment information DELTA_A, relative moving speed between the sender and receiver, atmospheric temperature, humidity, wind speed and image information (such as a picture which includes an area around the transmitter). Information RM includes but is not limited to any one or more of: current and previous demodulation angle information B, present and previous angle increment DELTA_B, relative moving speed between the sender and receiver, and atmospheric temperature, humidity, wind speed and image information (such as a picture which includes an area around the receiver).

FIGS. 2A to 2D show four examples of matching transmission beam with and receive beam. A and B may comprise one or more elements, where an element represents a specific direction angle. A pilot named P_A of pilot pattern P can be uniquely mapped to beam pair $(A_i, B_j)$, implying that the transmitter modulates P_A through transmission beam $A_i$; accordingly, the receiver receives and demodulates P_A through receive beam $B_j$.

Figures 3A, 3B:
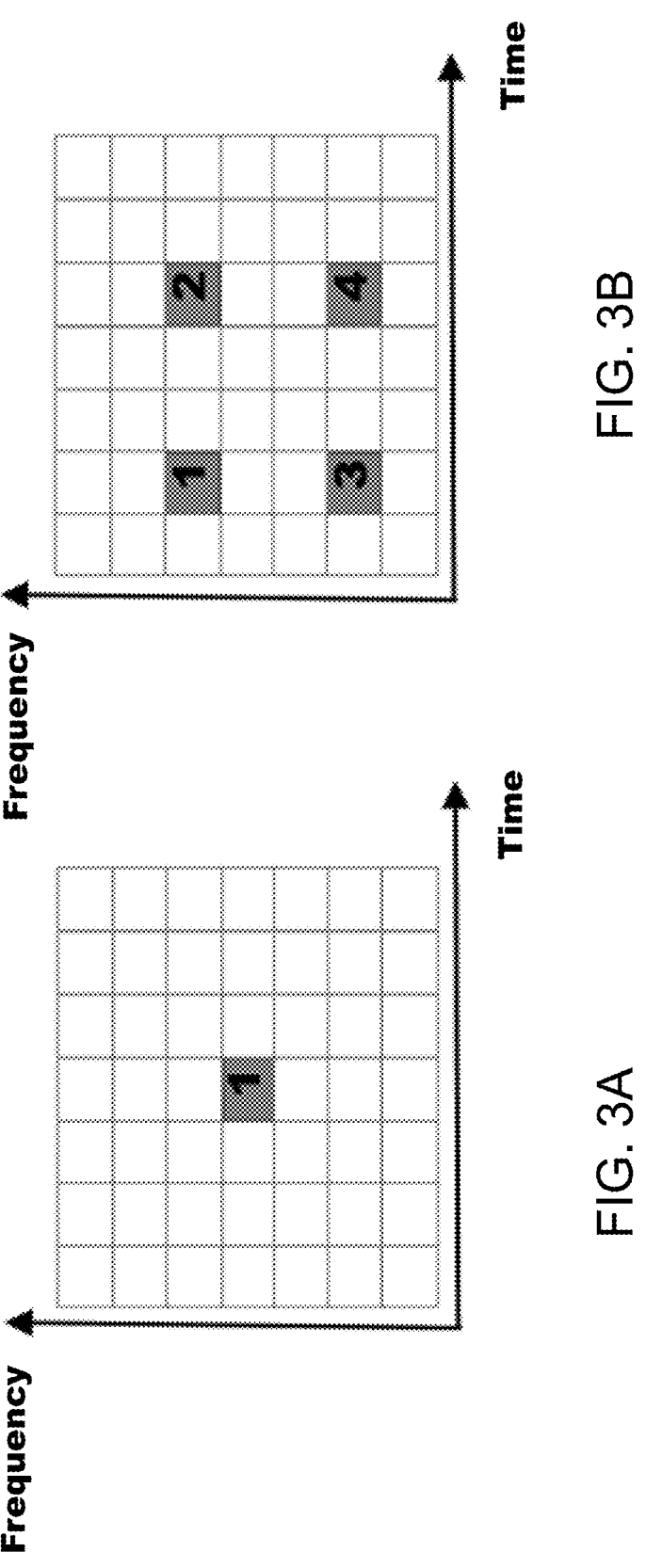
FIGS. 3A to 3B show an example of pilot pattern P style I and style II, respectively.

FIGS. 3A to 3B show an example of pilot pattern P type I and type II, respectively. In one case where the cardinality of A and B are both equal to 1, time-frequency resource block #1 in FIG. 3A will be used for carrying pilot P_A. The transmitter modulates P_A through transmission beam A and the receiver receives and demodulates P_A through receive beam B. In another case where the cardinality of A and B are more than 1, different beam pair will be used for respectively modulating and demodulating different pilots of pilot pattern P. As shown in FIG. 3B, transmission beam $A_1$ and receive beam $B_1$ are used for respectively modulating and demodulating the pilot P1 over resource block #1; Similarly, the transmitter and receiver modulate and demodulate pilot P2, P3 and P4 over resource block #2 #3 #4 individually through different beam pairs $(A_2, B_2)$, $(A_3, B_3)$ and $(A_4, B_4)$. In another case, two or more pilots over different resources block can be modulated and demodulated by a same beam pair. For example, the transmitter modulates the pilots over resource #1 #2 using beam A, and pilots over resource #3 #4 using beam $A_2$; the receiver demodulates the received pilots over resource #1 #2 using beam $B_1$ and pilots over #3 #4 using beam $B_2$. In another case, two or more pilots can be modulated and demodulated by a linear combination of beam pairs. For example, the transmitter modulates the pilot over the resource block #1 by beam $C_1$, where $F(C_1)=W_{11}F(A_1)+W_{12}F(A_2)$ and $F(\bullet)$ represents a function mapping, and the pilot over resource block #2 is modulated by beam $C_2$, where $F(C_2)=W_{21}F(A_1)+W_{22}F(A_2)$; correspondingly, the receiver demodulates the received pilot over the resource block #1 by beam $D_1$, where $F(D_1)=M_{11}F(B_1)+M_{12}F(B_2)$, and the pilot over resource #4 is done by beam $D_2$, where $F(D_2)=M_{21}F(B_1)+M_{22}F(B_2)$. With the same logic, the transmitter is to modulate the pilots over resource block #3 and #4 respectively through $F(C_3)$, $F(C_3)=W_{11}'F(A_3)+W_{12}'F(A_4)$, and $F(C_4),F(C_4)=W_{21}'F(A_3)+W_{22}'F(A_4)$; the receiver is to demodulate the received pilots over resource block #3 and #4 respectively through beam $D_1$, $F(D_3)=M_{11}'F(B_1)+M_{12}'F(B_2)$, and beam $D_4$, $F(D_4)=M_{21}'F(B_1)+M_{22}'F(B_2)$.

Figure 4:
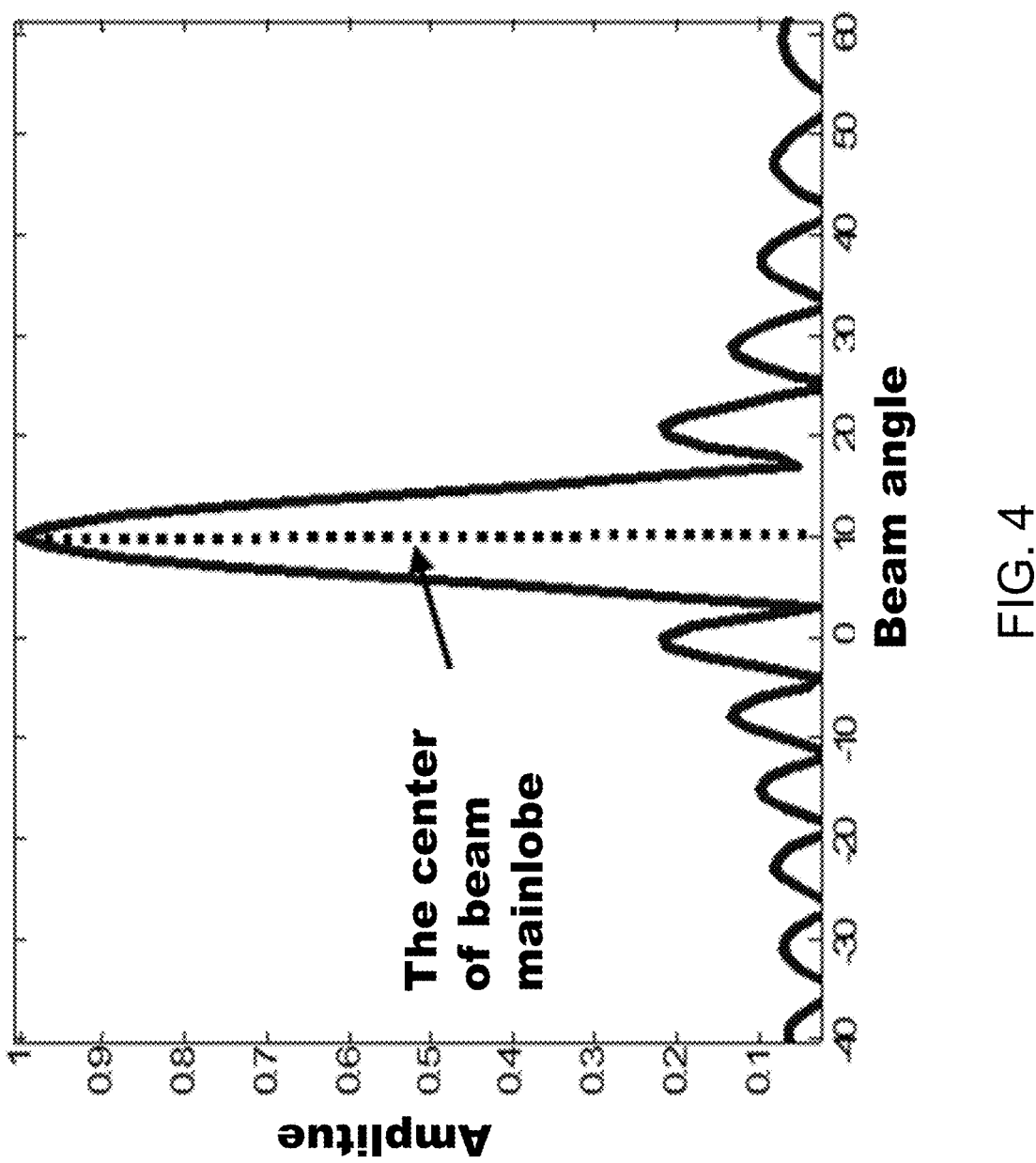
FIG. 4 shows a beam pattern where a center direction of a main lobe of the beam A/B is 10 degrees.

When the omnidirectional beam is employed, the value of beam bandwidth (such as 360 degrees) indicates that the used beam can cover all spatial directions. Besides, the beam angle in this patent can refer to the center angle of the beam main lobe as shown in FIG. 4.

The current modulation direction A can be obtained by the expression A=f(A',DELTA_A) where f is another function mapping. In one case, f may be a sum operation, e.g., A=A'+DELTA_A where DELTA_A denotes a change of beam modulation direction from the current time slot to a subsequent time slot of interest In one case, DELTA_A may be zero or empty, which indicates that there is no angle increment. Similarly, the current demodulation direction B also can be expressed as B=f(B', DELTA_B), where DELTA_B denotes a change of beam demodulation direction from the current time slot to a subsequent time slot of interest. When DELTA_B is set to zero or empty, it indicates that there is no angle increment. Methods of calculating the DELTA_A and DELTA_B such as fitting and machine learning are beyond the scope of this patent.

Methods of sending required information like A', DELTA_A or received pilot information PI back to the transmitter include but are not limited to: the required information is carried in the acknowledge frame, negative acknowledge frame, or the frame for channel state information feedback.

III. Example Embodiment 2

Figure 5:
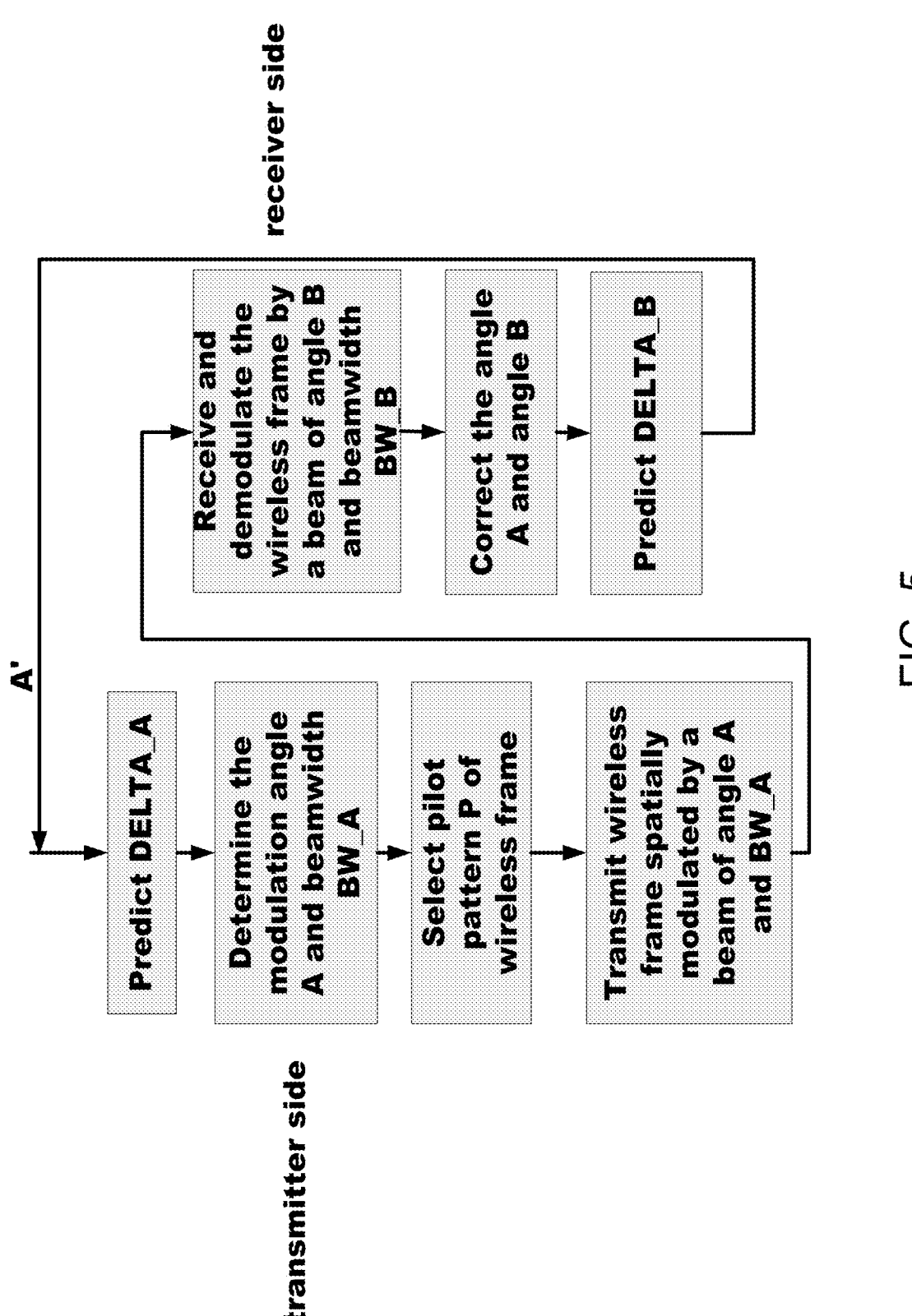
FIGS. 5 to 7 show flow diagrams of example methods for fast beam alignment according to some embodiments.

FIG. 5 shows a flow diagram of an example method for fast beam alignment according to Embodiment 2.

The transmitter performs the prediction of DELTA_A and determines the modulation direction A according to the information TM; selects the pilot pattern P associated with A; spatially modulates a wireless frame of carrying the pilot pattern P using a transmission beam of modulation direction A; transmits the wireless frame to the receiver. The receiver determines the demodulation direction B and beam width BW_B according to the information RN; receives and demodulates the wireless frame using a receive beam of demodulation direction B; corrects A and B based on information PI of pilot pattern P in the received wireless frame and the corresponding correction results are A' and B'; predicts the angle increment of B, DELTA_B for a next wireless frame and feeds back A' to the transmitter.

IV. Example Embodiment 3

Figure 6:
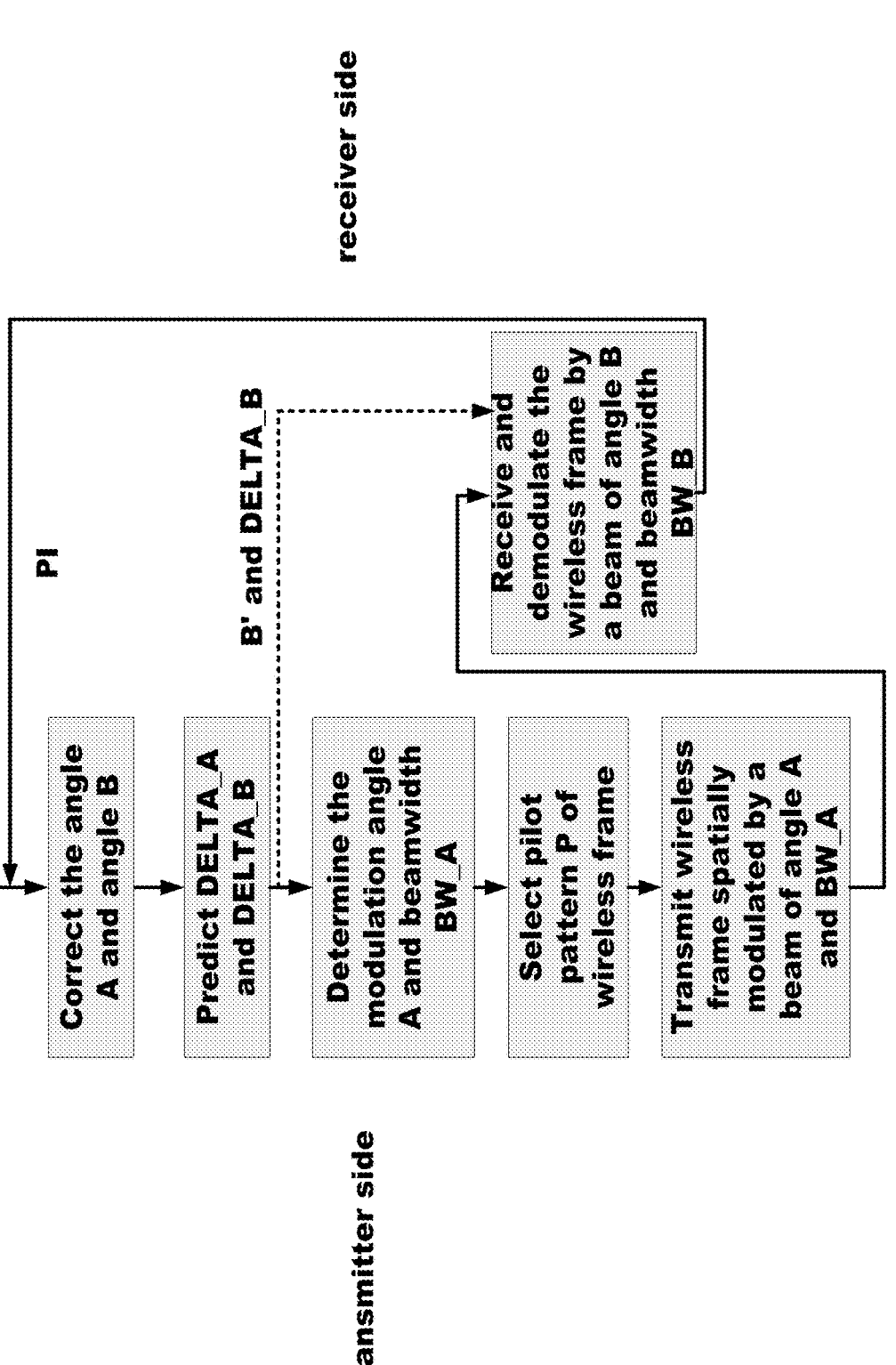

FIG. 6 shows a flow diagram of an example method for fast beam alignment according to Embodiment 3. the transmitter corrects A and B based on feedback information PI and the corresponding correction results are A' and B'; predicts the angle increments of A and B, e.g., DELTA_A and DELTA_B, for a next wireless frame; transmits the B' and DELTA_B to the receiver on a second communication link; determines the modulation direction A according to the information TM; selects the pilot pattern P associated with A; spatially modulates a wireless frame of carrying the pilot pattern P using a transmission beam of modulation direction A; transmits the wireless frame to the receiver on a first communication link. The receiver determines the demodulation direction B and beam width BW_B according to the information RM; receives and demodulates the wireless frame using a receive beam of demodulation direction B; feeds back the pilot information PI of received pilot pattern to the transmitter.

The second communication link may occupy the wireless channel in a different time slot from the first communication link, i.e. Time division is used for multiplexing the first and second communication links

V. Example Embodiment 4

Figure 7:
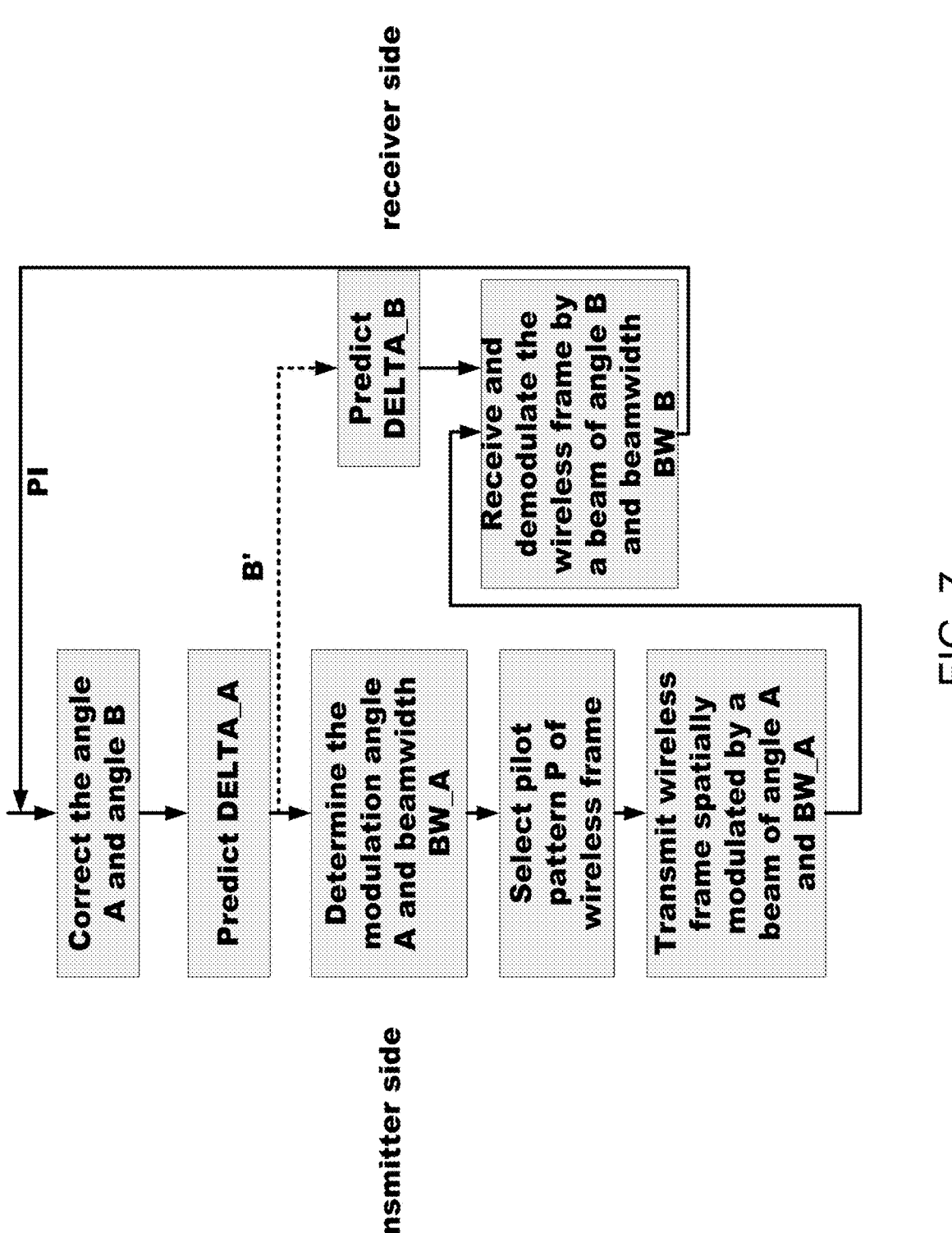

FIG. 7 shows a flow diagram of an example method for fast beam alignment according to Embodiment 4. the transmitter corrects A and B based on feedback information PI and the corresponding correction results are A' and B'; predicts the angle increments of A, e.g., DELTA_A for a next wireless frame; transmits the B' to the receiver on a second communication link; determines the modulation direction A according to the information TM; selects the pilot pattern P associated with A; spatially modulates a wireless frame of carrying the pilot pattern P using a transmission beam of modulation direction A; transmits the wireless frame to the receiver on a first communication link; The receiver determines the demodulation direction B and beam width BW_B according to the information RM; receives and demodulates the wireless frame using a receive beam of demodulation direction B; feeds back the pilot information PI of received pilot pattern to the transmitter.

This patent document describes, among other technical solutions: (1) correcting and updating beam modulation direction A and beam demodulation direction B; (2) determining the beam modulation direction increment DELTA_A and the beam demodulation direction increment DELTA_B, (3) in some embodiments, if the sending side is a computing processing center (e.g., a user equipment or base station) and the receiving side is not a computing processing center (e.g., a wireless sensor), then it may require the receiving side to feed back the pilot information PI to the sender; in some embodiments, if the receiving side is a computing processing center, then it may require the receiving side to feed back and increment DELTA_A to the sender. This patent document also describes pilot pattern P, and feedback of other information.

FIG. 8 shows an exemplary block diagram of a hardware platform 800 that may be a part of a network device (e.g., base station) or a communication device (e.g., a user equipment (UE)). The hardware platform 800 includes at least one processor 810 and a memory 805 having instructions stored thereupon. The instructions upon execution by the processor 810 configure the hardware platform 800 to perform the operations described in FIGS. 1 to 7, 9 to 17, and in the various embodiments described in this patent document. The transmitter 815 transmits or sends information or data to another device. For example, a network device transmitter can send a message to a user equipment. The receiver 820 receives information or data transmitted or sent by another device. For example, a user equipment can receive a message from a network device.

Figure 9:
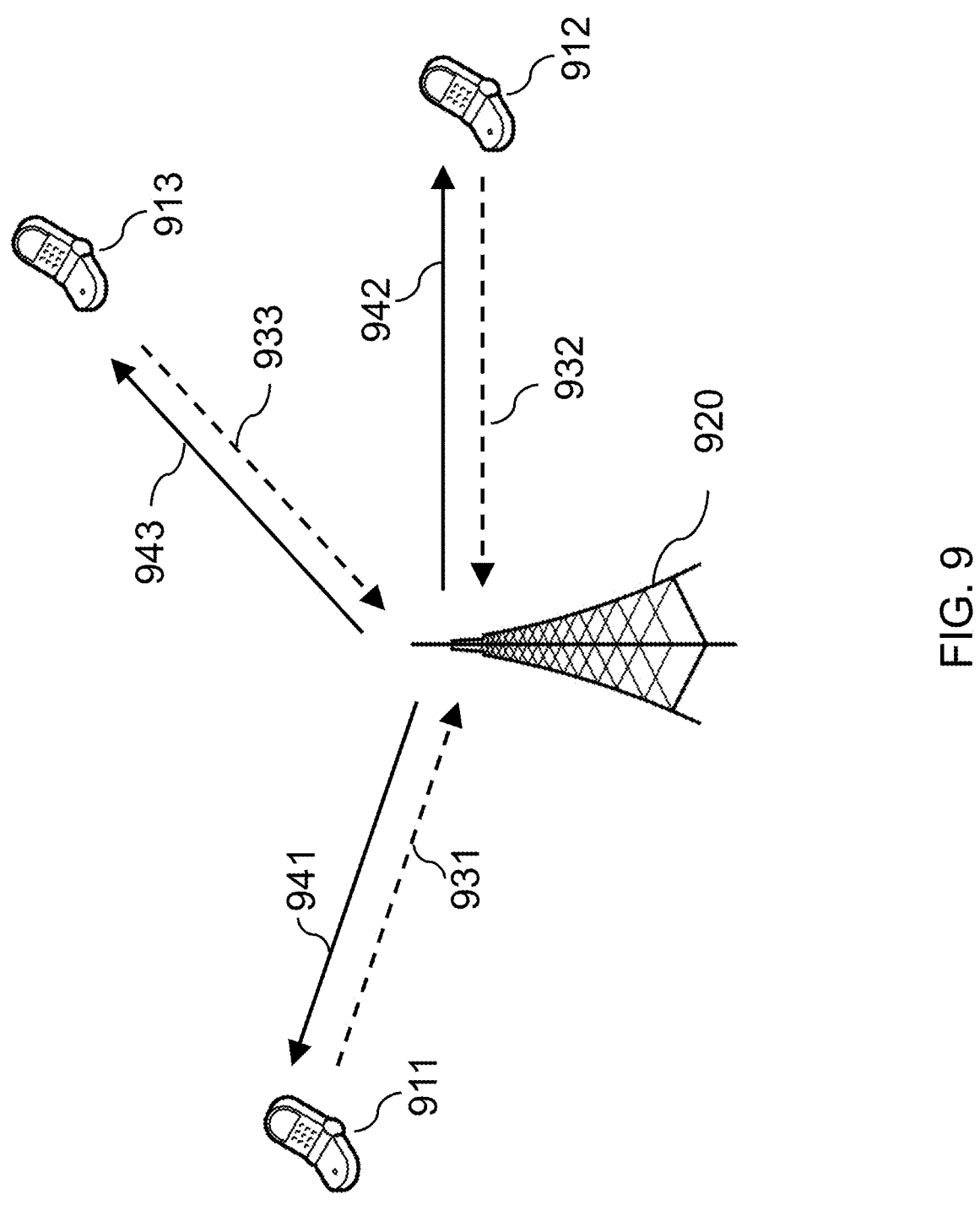
FIG. 9 shows an example of wireless communication including a base station (BS) and user equipment (UE) based on some implementations of the disclosed technology.

The implementations as discussed above will apply to a wireless communication. FIG. 9 shows an example of a wireless communication system (e.g., a 5G or NR cellular network) that includes a base station 920 and one or more user equipment (UE) 911, 912 and 913. In some embodiments, the UEs access the BS (e.g., the network) using a communication link to the network (sometimes called uplink direction, as depicted by dashed arrows 931, 932, 933), which then enables subsequent communication (e.g., shown in the direction from the network to the UEs, sometimes called downlink direction, shown by arrows 941, 942, 943) from the BS to the UEs. In some embodiments, the BS send information to the UEs (sometimes called downlink direction, as depicted by arrows 941, 942, 943), which then enables subsequent communication (e.g., shown in the direction from the UEs to the BS, sometimes called uplink direction, shown by dashed arrows 931, 932, 933) from the UEs to the BS. The UE may be, for example, a smartphone, a tablet, a mobile computer, a machine to machine (M2M) device, an Internet of Things (IoT) device, and so on.

FIG. 10 shows an exemplary flowchart for a transmitter device to receive a corrected modulation value and a modulation angle increment value. Operation 1002 includes transmitting, by a transmitter device to a receiver device, a wireless frame spatially modulated by a transmission beam of a transmission beam width, where the wireless frame includes a pilot pattern that is mapped to a modulation angle of the transmission beam. Operation 1004 includes receiving, from the receiver device, a corrected modulation angle value and a modulation angle increment value.

In some embodiments, a pilot in the pilot pattern is modulated by a single spatial beam or a weighted combination of multiple spatial beams. In some embodiments, the modulation angle and the transmission beam width are determined based on a set of information regarding spatial channel. In some embodiments, the set of information includes any one or more of: a current modulation angle and a previous modulation angle, a current modulation angle increment and a previous modulation angle increment, a relative moving speed between the transmitter device and the receiver device, an atmospheric temperature, a humidity, a wind speed, and/or an image information that provides information about an area where the transmitter device is operating. In some embodiments, the method further comprises determining, by the transmitter device, the modulation angle for a next wireless frame using the corrected modulation angle value and the modulation angle increment value, where the modulation angle for the next wireless frame is a sum of the corrected modulation angle value and the modulation angle increment value.

FIG. 11 shows an exemplary flowchart for a receiver device to transmit a corrected modulation angle value and a modulation angle increment value. Operation 1102 includes receiving, by a receiver device from a transmitter device, a wireless frame spatially demodulated by a receive beam having a receive beam width, where the wireless frame comprises a pilot pattern. Operation 1104 obtaining a corrected modulation angle value and a corrected demodulation angle value based on pilot information associated with the pilot pattern, a demodulation angle of the receive beam associated with the receiver device and a spatial modulation angle associated with the transmitter device. Operation 1106 includes determining a modulation angle increment value and a demodulation angle increment value for a next wireless frame. Operation 1108 includes transmitting, to the transmitter device, the corrected modulation angle value and the modulation angle increment value.

In some embodiments, the demodulation angle and the receive beam width is determined based on a set of information. In some embodiments, the set of information includes any one or more of: a current demodulation angle and a previous demodulation angle, a current demodulation angle increment and a previous demodulation angle increment, a relative moving speed between the transmitter device and the receiver device, an atmospheric temperature, a humidity, a wind speed, and/or an image information that provides information about an area where the receiver device is operating.

FIG. 12 shows an exemplary flowchart for a transmitter device to transmit wireless frame spatially modulated by a transmission beam of a transmission beam width. Operation 1202 includes receiving, by a transmitter device, feedback information. Operation 1204 includes transmitting, by the transmitter device to a receiver device, a wireless frame spatially modulated by a transmission beam of a transmission beam width in a time interval, where the wireless frame includes a pilot pattern mapped to a modulation angle, and where the wireless frame is transmitted on a first communication link.

In some embodiments, the feedback information includes information related to a plurality of pilots of the pilot pattern received by the receiver device in another time interval that precedes the time interval. In some embodiments, the method further comprises correcting, prior to the transmitting the wireless frame, the modulation angle and a demodulation angle; determining a modulation angle increment value and a demodulation angle increment value; and transmitting, to the receiver device, the demodulation angle and the demodulation angle increment value on a second communication link.

Figure 13:
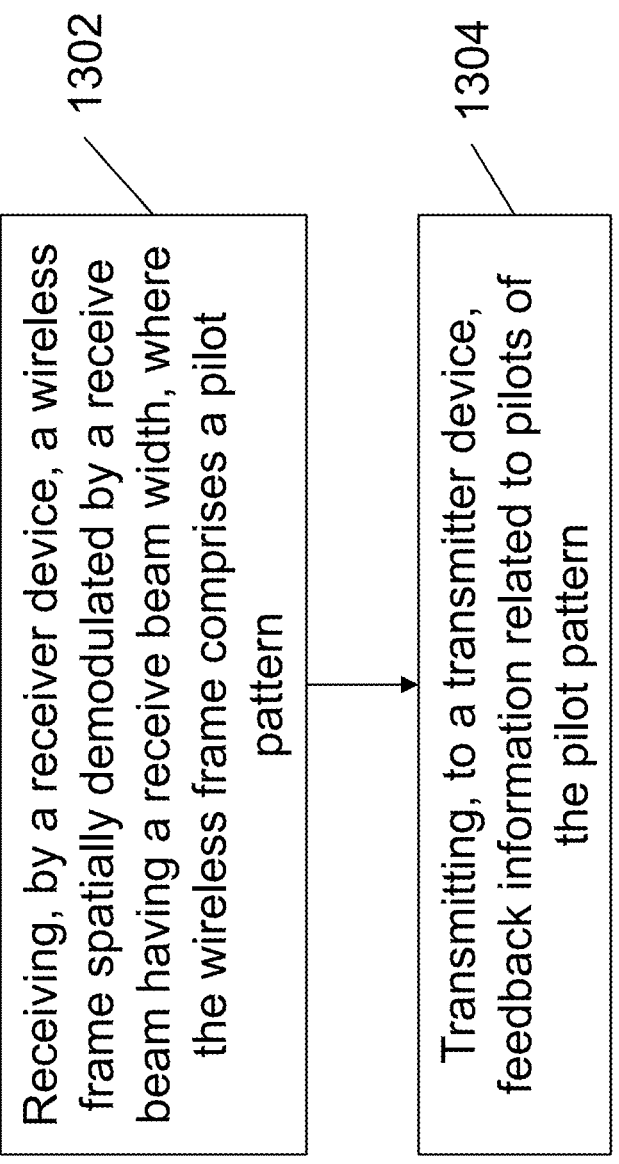
FIG. 13 shows an exemplary flowchart for a receiver device to transmit feedback information.

FIG. 13 shows an exemplary flowchart for a receiver device to transmit feedback information. Operation 1302 includes receiving, by a receiver device, a wireless frame spatially demodulated by a receive beam having a receive beam width, where the wireless frame comprises a pilot pattern. Operation 1304 includes transmitting, to a transmitter device, feedback information related to pilots of the pilot pattern.

In some embodiments, the feedback information includes information related to a plurality of pilots of the pilot pattern received by the receiver device.

Figure 14:
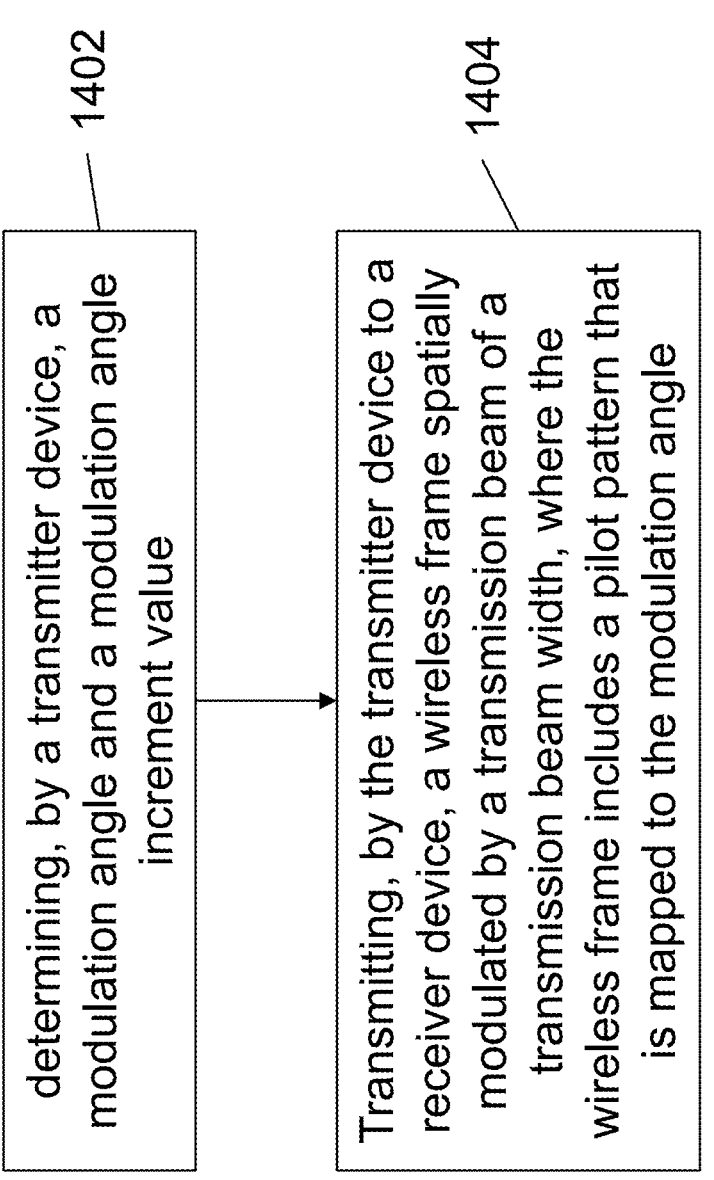
FIG. 14 shows an exemplary flowchart for a transmitter device to transmit a wireless frame spatially modulated by a transmission beam of a transmission beam width.

FIG. 14 shows an exemplary flowchart for a transmitter device to transmit a wireless frame spatially modulated by a transmission beam of a transmission beam width. Operation 1402 includes determining, by a transmitter device, a modulation angle and a modulation angle increment value. Operation 1404 includes transmitting, by the transmitter device to a receiver device, a wireless frame spatially modulated by a transmission beam of a transmission beam width, where the wireless frame includes a pilot pattern that is mapped to the modulation angle.

In some embodiments, the modulation angle is determined based on a set of information that includes any one or more of: a current modulation angle and a previous modulation angle, a current modulation angle increment and a previous modulation angle increment, a relative moving speed between the transmitter device and the receiver device, an atmospheric temperature, a humidity, a wind speed, and/or an image information that provides information about an area where the transmitter device is operating.

FIG. 15 shows an exemplary flowchart for a receiver device to transmit a corrected modulation angle value. Operation 1502 includes receiving, by a receiver device from a transmitter device, a wireless frame spatially demodulated by a receive beam having a receive beam width, where the wireless frame comprises a pilot pattern. Operation 1504 includes obtaining a corrected modulation angle value and a corrected demodulation angle value based on pilot information associated with the pilot pattern. Operation 1506 includes determining a demodulation angle increment value for a next wireless frame. Operation 1508 includes transmitting, to the transmitter device, the corrected modulation angle value.

In some embodiments, a demodulation angle of the receive beam and the receive beam width of the receive beam are determined based on a set of information. In some embodiments, the set of information includes any one or more of: a current demodulation angle and a previous demodulation angle, a current demodulation angle increment and a previous demodulation angle increment, a relative moving speed between the transmitter device and the receiver device, an atmospheric temperature, a humidity, a wind speed, and/or an image information that provides information about an area where the receiver device is operating.

FIG. 16 shows an exemplary flowchart for a transmitter device to transmit a wireless frame. Operation 1602 includes transmitting, by a transmitter device to a receiver device, a corrected demodulation angle value on a second communication link for a next wireless frame, where the corrected demodulation angle value is determined based on pilot information. Operation 1604 includes transmitting, by the transmitter device to the receiver device, the next wireless frame spatially modulated by a transmission beam of a transmission beam width, where the next wireless frame is transmitted on a first communication link, where the next wireless frame includes a pilot pattern that is mapped to a modulation angle.

In some embodiments, the transmitter device determines the corrected demodulation angle value and a corrected modulation angle value based on the pilot information. In some embodiments, the transmitter device determines the modulation angle based on a set of information that includes any one or more of: a current modulation angle and a previous modulation angle, a current modulation angle increment and a previous modulation angle increment, a relative moving speed between the transmitter device and the receiver device, an atmospheric temperature, a humidity, a wind speed, and/or an image information that provides information about an area where the transmitter device is operating.

Figure 17:
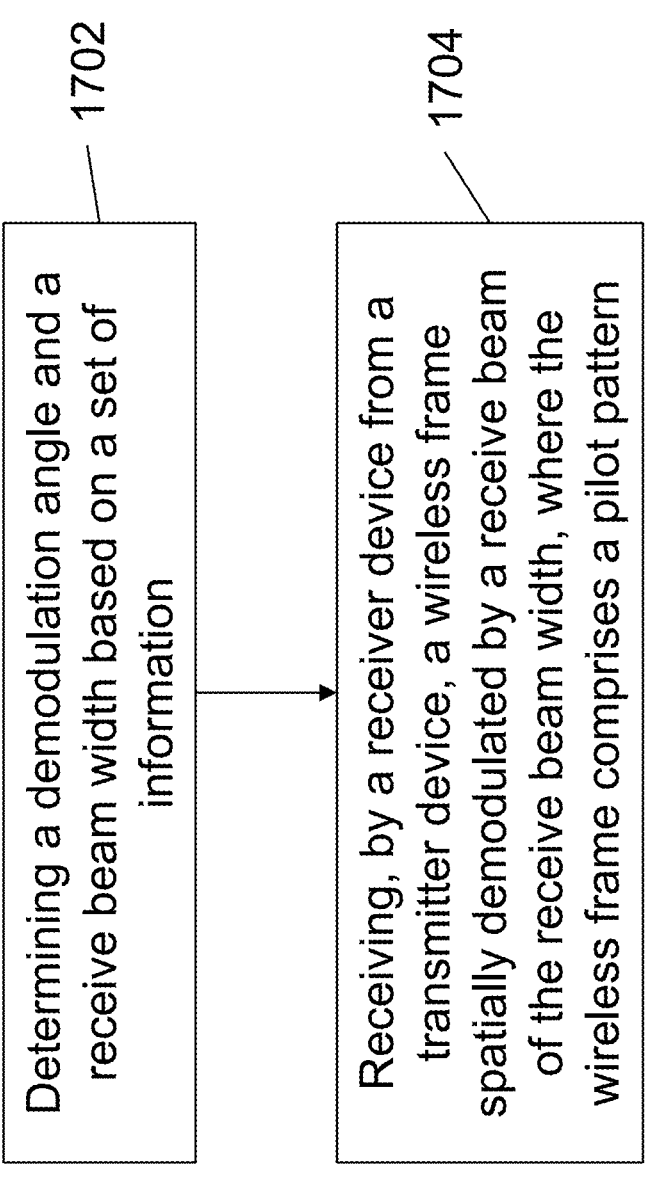
FIG. 17 shows an exemplary flowchart for a receiver device to receive a wireless frame.

FIG. 17 shows an exemplary flowchart for a receiver device to receive a wireless frame. Operation 1702 includes determining a demodulation angle and a receive beam width based on a set of information. Operation 1704 includes receiving, by a receiver device from a transmitter device, a wireless frame spatially demodulated by a receive beam of the receive beam width, where the wireless frame comprises a pilot pattern.

In some embodiments, the set of information includes any one or more of: a current demodulation angle and a previous demodulation angle, a current demodulation angle increment and a previous demodulation angle increment, a relative moving speed between the transmitter device and the receiver device, an atmospheric temperature, a humidity, a wind speed, and/or an image information that provides information about an area where the receiver device is operating.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:

transmitting, by a transmitter device to a receiver device, a wireless frame spatially modulated by a transmission beam of a transmission beam width, wherein the wireless frame includes a pilot pattern that is mapped to a modulation angle of the transmission beam;

receiving, from the receiver device, a corrected modulation angle value and a modulation angle increment value; and determining, by the transmitter device, a modulation angle for a next wireless frame using the corrected modulation angle value and the modulation angle increment value, wherein the modulation angle for the next wireless frame is a sum of the corrected modulation angle value and the modulation angle increment value.

2. The method of claim 1, wherein a pilot in the pilot pattern is modulated by a single spatial beam or a weighted combination of multiple spatial beams.

3. The method of claim 1, wherein the modulation angle and the transmission beam width are determined based on a set of information regarding spatial channel.

4. The method of claim 3, wherein the set of information includes any one or more of:

a current modulation angle and a previous modulation angle, a current modulation angle increment and a previous modulation angle increment, a relative moving speed between the transmitter device and the receiver device, an atmospheric temperature, a humidity, a wind speed, and/or an image information that provides information about an area where the transmitter device is operating.

5. A wireless communication method, comprising:

receiving, by a receiver device from a transmitter device, a wireless frame spatially demodulated by a receive beam having a receive beam width, wherein the wireless frame comprises a pilot pattern;

obtaining a corrected modulation angle value and a corrected demodulation angle value based on pilot information associated with the pilot pattern, a demodulation angle of the receive beam associated with the receiver device and a spatial modulation angle associated with the transmitter device;

determining a modulation angle increment value and a demodulation angle increment value for a next wireless frame; and transmitting, to the transmitter device, the corrected modulation angle value and the modulation angle increment value.

6. The method of claim 5, wherein the demodulation angle and the receive beam width is determined based on a set of information.

7. The method of claim 6, wherein the set of information includes any one or more of:

a current demodulation angle and a previous demodulation angle, a current demodulation angle increment and a previous demodulation angle increment, a relative moving speed between the transmitter device and the receiver device, an atmospheric temperature, a humidity, a wind speed, and/or an image information that provides information about an area where the receiver device is operating.

8. A transmitter device for wireless communication comprising at least one processor, configured to implement a method that causes the transmitter device to:

transmit, to a receiver device, a wireless frame spatially modulated by a transmission beam of a transmission beam width, wherein the wireless frame includes a pilot pattern that is mapped to a modulation angle of the transmission beam;

receive, from the receiver device, a corrected modulation angle value and a modulation angle increment value; and determine the modulation angle for a next wireless frame using the corrected modulation angle value and the modulation angle increment value, wherein the modulation angle for the next wireless frame is a sum of the corrected modulation angle value and the modulation angle increment value.

9. The transmitter device of claim 8, wherein a pilot in the pilot pattern is modulated by a single spatial beam or a weighted combination of multiple spatial beams.

10. The transmitter device of claim 8, wherein the modulation angle and the transmission beam width are determined based on a set of information regarding spatial channel.

11. The transmitter device of claim 10, wherein the set of information includes any one or more of:

a current modulation angle and a previous modulation angle, a current modulation angle increment and a previous modulation angle increment, a relative moving speed between the transmitter device and the receiver device, an atmospheric temperature, a humidity, a wind speed, and/or an image information that provides information about an area where the transmitter device is operating.

12. A receiver device for wireless communication comprising at least one processor, configured to implement a method that causes the receiver device to:

receive, from a transmitter device, a wireless frame spatially demodulated by a receive beam having a receive beam width, wherein the wireless frame comprises a pilot pattern;

obtain a corrected modulation angle value and a corrected demodulation angle value based on pilot information associated with the pilot pattern, a demodulation angle of the receive beam associated with the receiver device and a spatial modulation angle associated with the transmitter device;

determine a modulation angle increment value and a demodulation angle increment value for a next wireless frame; and transmit, to the transmitter device, the corrected modulation angle value and the modulation angle increment value.

13. The receiver device of claim 12, wherein the demodulation angle and the receive beam width is determined based on a set of information.

14. The receiver device of claim 13, wherein the set of information includes any one or more of:

a current demodulation angle and a previous demodulation angle, a current demodulation angle increment and a previous demodulation angle increment, a relative moving speed between the transmitter device and the receiver device, an atmospheric temperature, a humidity, a wind speed, and/or an image information that provides information about an area where the receiver device is operating.

\*  \*  \*  \*  \*